(12) United States Patent
Boronowsky et al.

(10) Patent No.: US 12,541,637 B2
(45) Date of Patent: Feb. 3, 2026

(54) REINFORCEMENT LEARNING BASED CORRECTION OF TIMING FAILURES

(71) Applicant: International Business Machines Corporation, Armonk, NY (US)

(72) Inventors: Gregor Boronowsky, Böblingen (DE); Marvin von der Ehe, Vellmar (DE); Manuel Beck, Dettingen unter Teck (DE); Jan Niklas Stegmaier, Sindelfingen (DE); Simon Hermann Friedmann, Böblingen (DE)

(73) Assignee: International Business Machines Corporation, Armonk, NY (US)

( * ) Notice: Subject to any disclaimer, the term of this patent is extended or adjusted under 35 U.S.C. 154(b) by 603 days.

(21) Appl. No.: 18/063,408

(22) Filed: Dec. 8, 2022

(65) Prior Publication Data

US 2024/0135083 A1 Apr. 25, 2024
US 2024/0232503 A9 Jul. 11, 2024

(30) Foreign Application Priority Data

Oct. 19, 2022 (GB) .................................... 2215433

(51) Int. Cl.
*G06F 30/398* (2020.01)
*G06N 3/04* (2023.01)
*G06N 3/092* (2023.01)
*G06F 119/12* (2020.01)

(52) U.S. Cl.
CPC ............ *G06F 30/398* (2020.01); *G06N 3/04* (2013.01); *G06N 3/092* (2023.01); *G06F 2119/12* (2020.01)

(58) Field of Classification Search
CPC ................................................... G06F 30/398
USPC .......................................................... 716/113
See application file for complete search history.

(56) References Cited

U.S. PATENT DOCUMENTS

| 9,792,397 | B1 | 10/2017 | Nagaraja |
| 2004/0261046 | A1 | 12/2004 | Nair |
| 2009/0313596 | A1 | 12/2009 | Lippmann |
| 2019/0228126 | A1 | 7/2019 | Oh |

(Continued)

FOREIGN PATENT DOCUMENTS

| CN | 114154412 A | 3/2022 |
| WO | 2021216923 A1 | 10/2021 |

OTHER PUBLICATIONS

Agnesina et al., "VLSI Placement Parameter Optimization using Deep Reinforcement Learning," ICCAD '20: IEEE/ACM International Conference on Computer-Aided Design, Nov. 2020, 10 pages. <DOI:10.1145/3400302.3415690>.

(Continued)

*Primary Examiner* — Eric D Lee
(74) *Attorney, Agent, or Firm* — Stephen R. Yoder

(57) ABSTRACT

Disclosed herein is a computer implemented method of correcting a timing failure of a network of conductors and repowering structures in an integrated circuit design using a reinforcement learning agent. The reinforcement learning agent comprises a neural network. The method comprises: receiving a graph comprising nodes and edges that encodes said network of conductors and repowering structures; and receiving a modification recommendation from said reinforcement learning agent in response to inputting said graph into said reinforcement learning agent.

24 Claims, 14 Drawing Sheets

(56) References Cited

U.S. PATENT DOCUMENTS

| 2021/0073456 | A1 | 3/2021 | Nath |
| 2021/0158127 | A1 | 5/2021 | Ren |
| 2022/0043951 | A1 | 2/2022 | Ho |
| 2022/0229960 | A1* | 7/2022 | Nath ............ G06F 30/3315 |

OTHER PUBLICATIONS

Bartoschek, C., Fast Repeater Tree Construction, Dissertaion, Sep. 18, 2014, 147 pages. <https://bonndoc.ulb.uni-bonn.de/xmlui/handle/20.500.11811/6134>.

Cheng et al., "On Joint Learning for Solving Placement and Routing in Chip Design," 35th Conference on Neural Information Processing Systems (NeurIPS 2021), pp. 1-12. <https://openreview.net/forum?id=rsd-9hClit3>.

Hosny et al., "DRiLLS: Deep Reinforcement Learning for Logic Synthesis," Nov. 13, 2019, 6 pages, arXiv:1911.04021v2.

Lu et al., "RL-Sizer: VLSI Gate Sizing for Timing Optimization using Deep Reinforcement Learning," 2021 58th ACM/IEEE Design Automation Conference (DAC), 2021, pp. 733-738, IEEE. <https://ieeexplore.ieee.org/document/9586138>.

Mathur, M., "Routing and Placement of Macros using Deep Reinforcement Learning," May 19, 2022, pp. 1-10, arXiv:2205.09289v1.

Mirhoseini et al., "A graph placement methodology for fast chip design," Nature, vol. 594, Jun. 10, 2021, pp. 207-229. <https://doi.org/10.1038/s41586-021-03544-w>.

Mirhoseini et al., "Chip Placement with Deep Reinforcement Learning," Apr. 22, 2020, 15 pages, arXiv:2004.10746v1.

Ren et al., "Invited-NVCell: Standard Cell Layout in Advanced Technology Nodes with Reinforcement Learning," 2021 58th ACM/IEEE Design Automation Conference (DAC), 2021, pp. 1291-1294, IEEE. <https://ieeexplore.ieee.org/document/9586188>.

Sanchez Lopera et al., "A Survey of Graph Neural Networks for Electronic Design Automation," 2021 ACM/IEEE 3rd Workshop on Machine Learning for CAD (MLCAD) 2021, 6 pages, IEEE. <https://ieeexplore.ieee.org/document/9531070>.

Settaluri et al., "AutoCkt: Deep Reinforcement Learning of Analog Circuit Designs," Jan. 20, 2020, 6 pages, arXiv:2001.01808v2.

Stefanidis et al., "Multi-Armed Bandits for Autonomous Timing-driven Design Optimization," 2019 29th International Symposium of Power and Timing Modeling, Optimization and Simuarion (PATMOS), 2019, pp. 17-22, IEEEE. <https://ieeexplore.ieee.org/document/8862056>.

Wang et al., "GCN-RL Circuit Designer: Transferable Transistor Sizing with Graph Neural Networks and Reinforcement Learning," The 57th Design Automation Conference (DAC 2020), Apr. 30, 2020, 6 pages, arXiv:2005.00406v1.

Zhu et al., "Exploring Logic Optimizations with Reinforcement Learning and Graph Convolutional Network," MLCAD 20: Proceedings of the 2020 ACM/IEEE Workshop on Machine Learning for CAD, Nov. 2020, pp. 145-150. <https://doi.org/10.1145/3380446.3430622>.

Boronowsky et al., "Reinforcement Learning Based Correction of Timing Failures," GB Application No. 2215433.0, Filed Oct. 19, 2022.

Search Report, Patents Act 1977: Search Report under Section 17(5), Application No. GB2215433.0, Dated Apr. 26, 2023, 4 pages.

* cited by examiner

REINFORCEMENT LEARNING BASED CORRECTION OF TIMING FAILURES

BACKGROUND

The present invention relates to the design of integrated circuits, in particular to the correction of timing failures of a network of conductors and repowering structures in an integrated circuit design.

During the design of an integrated circuit, signals carried on a network of conductors may degrade due to parasitic capacitances, resistance, and noise. This may result in timing errors such as the signal edge arriving too late (a slack fail) or the signal edge not being steep enough (a slew fail). Correcting these timing errors may involve making adjustments to the network of conductors or adding repowering structures (e.g., buffers or inverters). This however may be a very labor intensive and time-consuming process that is performed manually.

SUMMARY

In one aspect the invention provides for a computer-implemented method of correcting a timing failure of a network of conductors and repowering structures in an integrated circuit design using a reinforcement learning agent. The reinforcement learning agent comprises a neural network. The method comprises receiving a graph comprising nodes and edges that encodes the network of conductors and repowering structures. The design of the network of conductors and repowering structures is encoded in the graph. A repowering structure as used herein encompasses an electronic circuit that functions as a unity gain amplifier or inverter. Examples of repowering structures may include buffers, repeaters, and inverters. The method further comprises receiving a modification recommendation from the reinforcement learning agent in response to inputting the graph into the reinforcement learning agent.

According to a further aspect of the present invention, the invention provides for a computer program product that comprises a computer-readable storage medium that has computer-readable program code embodied on it. The computer-readable program code is configured to implement a method according to an embodiment.

According to a further aspect of the present invention, the invention provides for a computer system that comprises a processor configured for controlling the computer system. The computer system further comprises a memory storing machine-executable instructions and a reinforcement learning agent. The reinforcement learning agent comprises a neural network. Execution of the instructions causes the processor to receive a graph comprising nodes and edges that encode a network of conductors and repowering structures in an integrated circuit design. Execution of the instructions further causes the processor to receive a modification recommendation in response to inputting the graph into the neural network reinforcement learning agent.

According to a further aspect of the present invention, the invention provides for a computer program product.

BRIEF DESCRIPTION OF THE DRAWINGS

In the following embodiments of the invention are explained in greater detail, by way of example only, making reference to the drawings in which.

DETAILED DESCRIPTION

Figure 1:
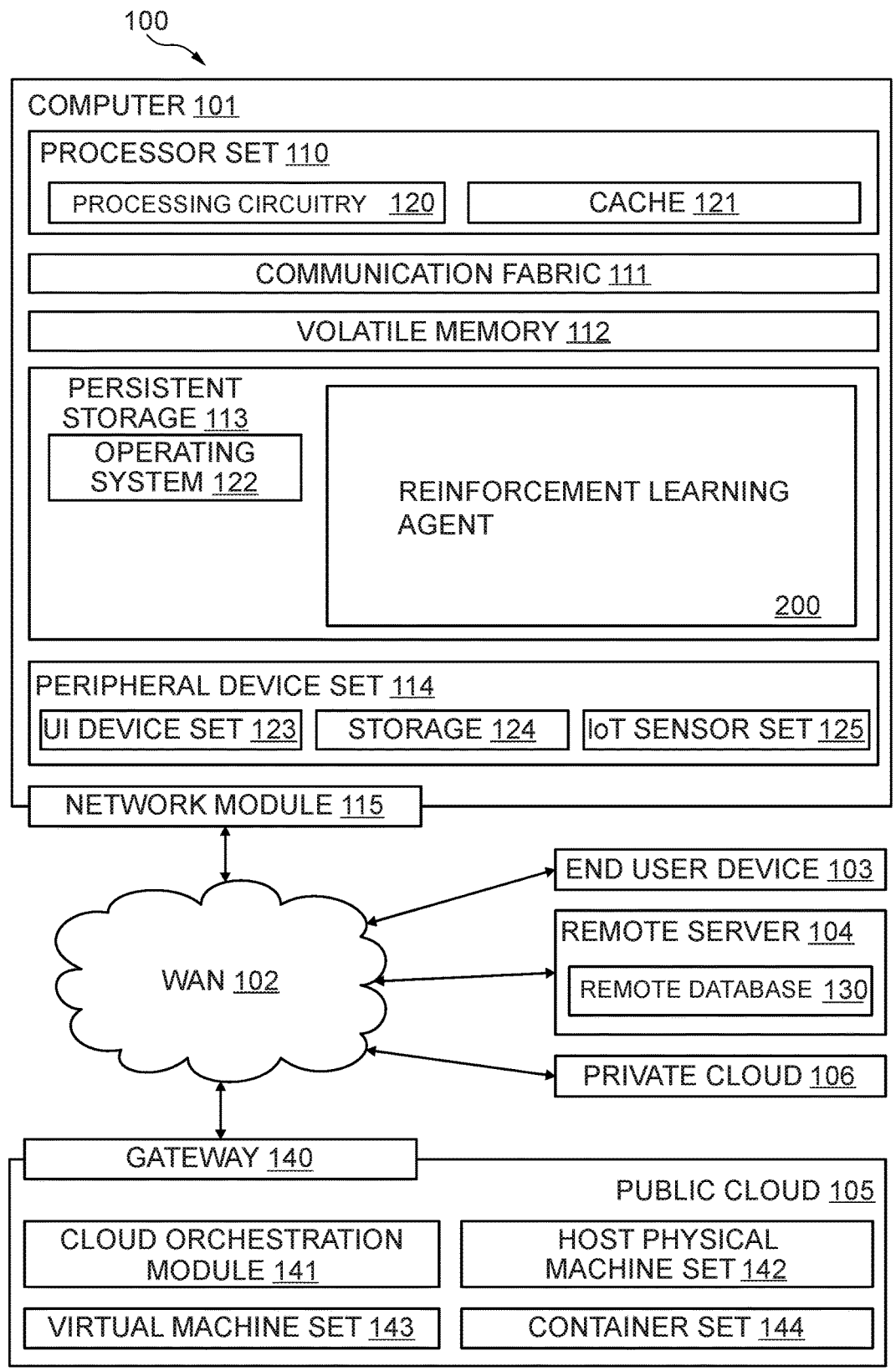
FIG. 1 illustrates an example of a computing environment.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments may be beneficial because it may provide for a means of automating the correction of timing failures for networks of conductors and repowering structures in an integrated circuit design.

In another embodiment, the method further comprises generating modification commands that are configured for modifying the integrated circuit design using the modification recommendation. This embodiment may be beneficial because the modification commands may be used to control a software model or agent that is used to modify the integrated circuit design.

In another embodiment, the method further comprises inputting the integrated circuit design into circuit simulation module to detect the timing failure of the network of conductors and repowering structures. The method further comprises encoding the network of conductors and repowering structures as the graph. The method further comprises constructing a modified integrated circuit design by modifying the integrated circuit design using the modification commands. The method further comprises inputting the modified integrated circuit design into the circuit simulation module to detect a status of the timing failure. For example, it can be determined if the timing failure has been corrected or if the timing failure is worse than it was before.

The method further comprises determining a training reward for the reinforcement learning agent using the status of the timing failure. The method further comprises training the reinforcement learning agent using the training reward. This embodiment may be beneficial because the reinforcement learning agent may be improved during the process of correcting the timing failure. This for example may then be applied to other integrated circuit designs as well as improving the performance of correcting the timing failure for the current integrated circuit design.

In another embodiment, the method further comprises repeating the method until the timing failure is resolved.

In another embodiment, the training reward is calculated as a constant penalty for action taken by the reinforcement learning agent. This embodiment may be beneficial because it will prioritize the correction of the timing failure as well as to minimize the time to solution and computation time that is used.

In another embodiment, the training reward is calculated as a per-action penalty. In this embodiment the per-action penalty may be determined by a hyper parameter. For example, particular actions may have a particular penalty assigned to them. These penalties may be defined by the operator or user or a hyper parameter optimizer based on impact on side constraints. The benefit of this may include the agent minimizes the number of steps to solution and minimizes the computational time. This may be done while heuristically taking side constraints into account which are encoded as the per action penalties. This may eliminate the need to evaluate side constraints in a circuit editor or circuit CAD system for designing the integrated circuit design. This may mean that the evaluation is performed quite quickly.

In another embodiment, the training reward is calculated using the weighted constraint of power consumption by the integrated circuit. This may be beneficial because it may be used to reduce the amount of power used by the integrated circuit.

In another embodiment, the training reward is calculated using the weighted constraint of the length of the network of conductors. This may be useful in reducing the total length or amount of conductive material.

In another embodiment, the training reward is calculated using the noise of the network of conductors. This may be beneficial because it may be used for reducing the noise level.

In another embodiment, the training reward is calculated using the weighted constraint of route congestion of the network of conductors. This may be beneficial because it may be useful in reducing the route congestion.

In another embodiment, the training reward is calculated using the weighted constraint of the placement congestion of the network of conductors. This may be beneficial in reducing the amount of congestion of the network of conductors.

In another embodiment, the nodes comprise an instance in the conductor network. The edges are directed edges representing a conductor between two instances in the conductor network. The nodes comprise a set of property vectors descriptive of the nodes and the edges. An instance in the conductor network may for example be a repowering structure. This may be beneficial because it may provide for an accurate means of encoding the network of conductors and repowering structures such that they can be modified by a reinforcement learning agent. In another embodiment the property vectors are descriptive of the directed edges either directed into or directed out of the nodes.

In another embodiment, the method further comprises normalizing the set of property vectors of the graph before inputting the graph into the reinforcement learning agent. This normalization process may enable the reinforcement learning agent to be reused for a variety of integrated circuit designs. This may also enable any improvements made to the reinforcement learning agent during the determination of the timing failure to be applied to other integrated circuit designs.

In another embodiment, the graph is normalized relative to the source coordinates as a multiple of or a fraction of the lowest metal layer cycle reach of said integrated circuit design. This normalization may be beneficial because it then enables the reinforcement learning agent to be used for a variety of designs which is not dependent on the actual dimensions of the lowest metal layer cycle reach of the integrated circuit design.

In another embodiment, the graph is normalized such that it is a multiple of or a fraction of the signal cycle time of the integrated circuit design. This embodiment may be beneficial because then the reinforcement learning agent functions independently of the actual signal cycle time.

In another embodiment, the graph is normalized as a multiple of or a fraction of a signal slew limit of the integrated circuit design. This embodiment is beneficial because this normalization generalizes the operation of the reinforcement learning agent to be independent of the actual signal slew limit.

In another embodiment, the neural network of the reinforcement learning agent is configured to provide a score for possible circuit modifications. Receiving the modification recommendation in response to inputting the graph into the neural network reinforcement learning agent comprises selecting the modification recommendation from the score for the possible circuit modifications by the reinforcement learning agent or is received from a user interface. For example, an automated algorithm may use the score to automatically select the modification recommendation. In other instances, several may be displayed on a user interface along with the score and this may then be entered into the user interface by a user. The score may take different forms in different examples. In one example the score may be a probability metric. In other examples the score may be a state-action value.

In another embodiment, the method further comprises constructing a set of masks marking the possible modification recommendation of the conductor network as possible or impossible. The selection of the modification recommendation then comprises excluding the possible modification recommendations marked as impossible. For example, there may be particular modifications to the network of conductors and repowering structures that are not allowed or not possible with the current configuration. This embodiment may be beneficial because the set of masks may be used to exclude these impossible modifications.

In another embodiment, the neural network is a graph neural network. A graph neural network as used herein is a network that is able to receive a graph data structure and provide output in response to receiving this graph neural network.

The neural network comprises an embedding portion that is configured to output a message vector in response to receiving the property vector of a node of the graph encoding the network of conductors and repowering structures. The neural network further comprises a concatenating portion that is configured to concatenate the message vector of the node and the message vector of adjacent nodes of the graph into a neighborhood representation vector. The neural network further comprises a processing node that is configured to output a node-specific modification recommendation for the node in response to receiving the neighborhood representation vector.

The modification recommendation is formed from a collection of the node-specific modification recommendations for the graphs. This embodiment may be beneficial because the structure of having the embedding portion, the concatenating portion and a processing node enables graphs of arbitrary shape to be processed and enable the modification recommendation to be formed.

In another embodiment, the embedding portion comprises a neural network that comprises one or more fully connected neural network layers. This embodiment may be beneficial because the use of the one or more fully connected neural network layers provides an effective means of outputting the message vector.

In another embodiment, the processing node comprises a neural network that comprises one or more fully connected neural network layers. This embodiment may be beneficial because the use of one or more fully connected layers provides an effective means of outputting the node specific modification recommendation.

In another embodiment, the adjacent node comprises a single source node. The concatenating portion of the neural network is configured to receive only a single message vector from the adjacent source node. In this embodiment the structure of the graph is detailed such that there is a single source of current which then flows into a number of sinks.

The adjacent nodes comprise one or more adjacent sink nodes. The concatenating portion of the neural network is configured to receive one or more message vectors from the adjacent sink nodes.

The one or more message vectors of the one or more adjacent sink nodes is reduced to a single message vector by the concatenating layer by any one of the following: calculating a sum of the one or more message vectors, taking an element-wise maximum of one or more message vectors, and calculating a mean of the one or more message vectors. This embodiment may be beneficial because it may enable a standardized processing node. Regardless of the number of sink nodes they are always reduced to a single message vector.

In another embodiment, the timing failure is a slack failure.

In another embodiment, the timing failure is a slew failure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as a reinforcement learning agent 200 that provides a modification recommendation for resolving a timing failure of a network of conductors and repowering structures. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
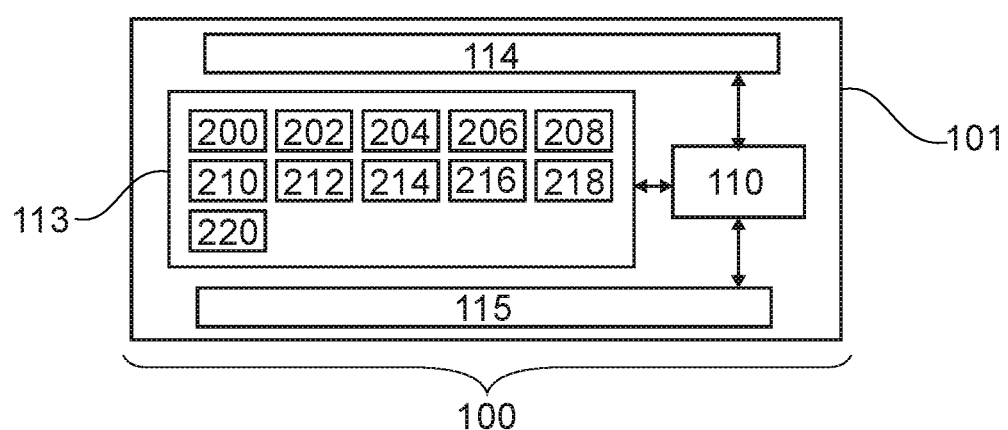
FIG. 2 shows a further view of the computing environment of FIG. 1.

FIG. 2 shows a further view of the computing environment 100. The persistent storage 113 is shown as containing the reinforcement learning agent 200 that comprise a neural network. The persistent storage 113 is further shown as containing machine-executable instructions 202. The machine-executable instructions 202 enable the processor set 110 to perform various tasks such as data manipulation and numerical calculations. The persistent storage 113 is further shown as containing an integrated circuit design 204. The integrated circuit design comprises at least one network of conductors and repowering structures. The integrated circuit design may comprise multiple networks of repowering structures.

The persistent storage 113 is further shown as containing a circuit simulation module 206 that takes the integrated circuit design 204 as input. The persistent storage 113 is further shown as containing a detected timing failure 208 that was output by the circuit simulation module 206 for a network of conductors and repowering structures in response to receiving the integrated circuit design 204. In some instances, there may be multiple timing failures detected for different networks of conductors and repowering structures. The memory 113 is further shown as containing a graph 210 that represents the network of conductors and repowering structures of the integrated circuit design 204.

The persistent storage 113 is further shown as containing modification recommendation 212 received from the reinforcement learning agent 200 in response to inputting the graph 210 into the reinforcement learning agent 200. The persistent storage 113 is further shown as containing modification commands 214 that were constructed using the modification recommendation 212. The modification commands 214 contain instructions on how to modify the integrated circuit design 204 by modifying the network of conductors and repowering structures represented by the graph 210. The persistent storage 113 is further shown as containing a modified integrated circuit design 216 that was created by using the modification commands 214 to modify the integrated circuit design 204. The persistent storage 113 is further shown as containing a status of the timing failure 208 that was determined by inputting the modified integrated circuit design 216 into the circuit simulation module 206. The status of the timing failure 208 would for example indicate if the modified integrated circuit design has resolved the timing failure 208 or not. Based on the status 218 of the timing failure 208 a training reward 220, which is also shown as stored in the persistent storage 113, is then used to train and update the reinforcement learning agent 200.

Figure 3:
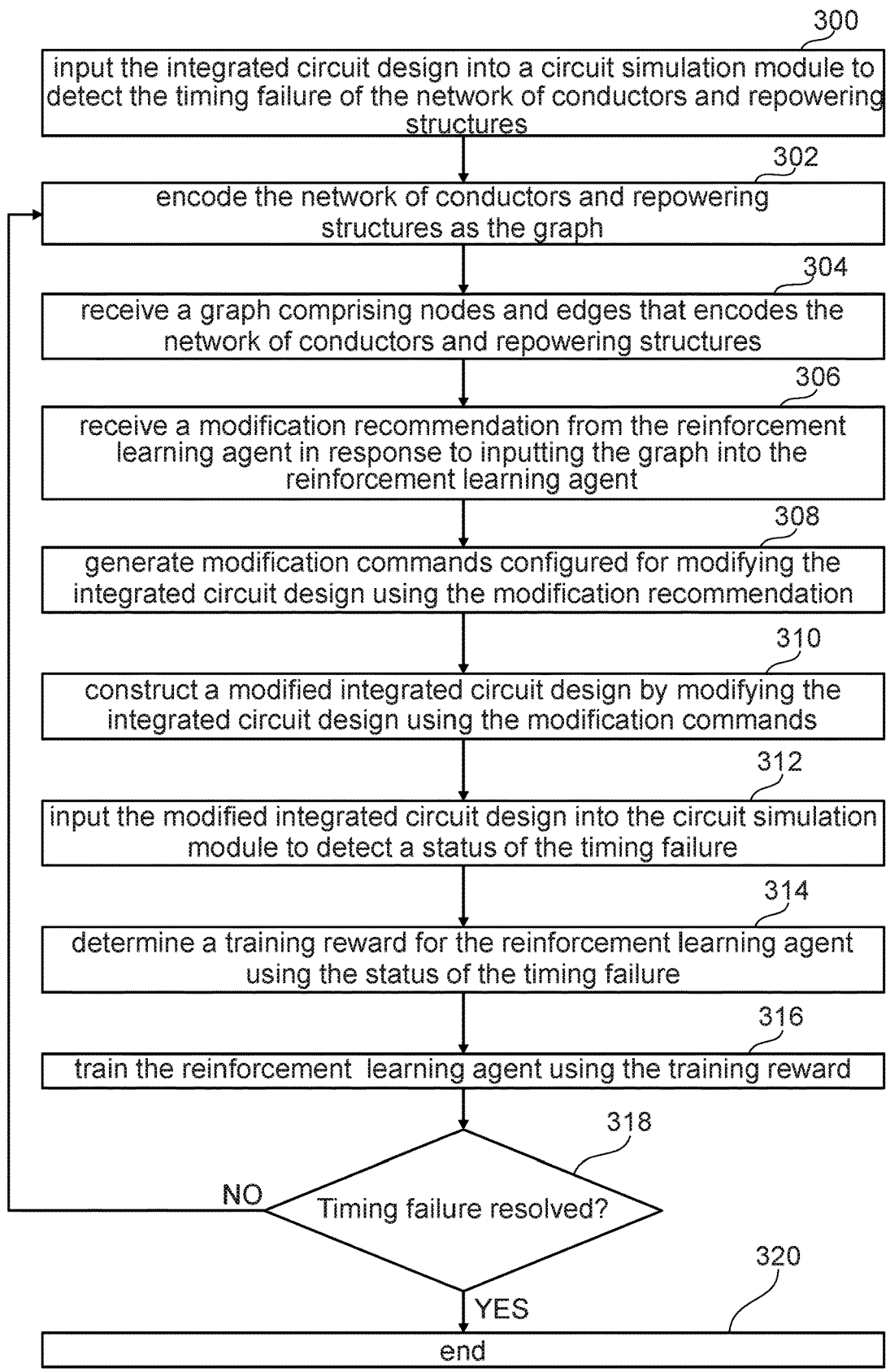
FIG. 3 shows a flow chart which illustrates a method of operating a computer within the computing environment of FIG. 1 or 2.

FIG. 3 shows a flowchart which illustrates a method of operating the computing environment 100. The method shown in FIG. 3 represents a method of correcting or resolving a timing failure for one network of network of conductors and repowering structures. The method illustrated in FIG. 3 may for example be performed serially or in parallel if there are multiple networks of conductors and repowering structures with timing failures.

First, in step 300, the integrated circuit design 204 is input into a circuit simulation module 206 to detect the timing failure 208. Next, in step 302, the network of conductors and repowering structures that are part of the integrated circuit design 204, are encoded into the graph 210. Next, in step 304, the graph 210 is received. The graph comprises nodes and edges that encode the network of conductors and repowering structures. Then, in step 306, the modification recommendation 212 is received from the reinforcement learning agent 200 in response to inputting the graph 210 into the reinforcement learning agent 200. Next in step 308, the method further comprises generating the modification commands 214 for modifying the integrated circuit design 204.

Next in step 310, a modified integrated circuit design 216 is constructed by modifying the integrated circuit design 204 with the modification commands 214. Next, in step 312, the modified integrated circuit design 216 is input into the circuit simulation module 206 to detect a status of the timing failure 208. Next, in step 314, the training reward 220 is determined and this is used in step 316 to train the reinforcement learning agent 200. Step 318 is a decision box with the question, is the timing failure resolved. If the answer is "yes" the method proceeds to step 320 and the method ends. If the answer is "no," then the method goes back to step 302 and the modified integrated circuit design 216 is encoded as a new graph and the method then follows through steps 304 etc.

In some examples, the method comprises steps 304 and 306, and the other steps are optional. In other examples, the method only comprises steps 304, 306, and 308, and the other steps are optional.

Figure 4:
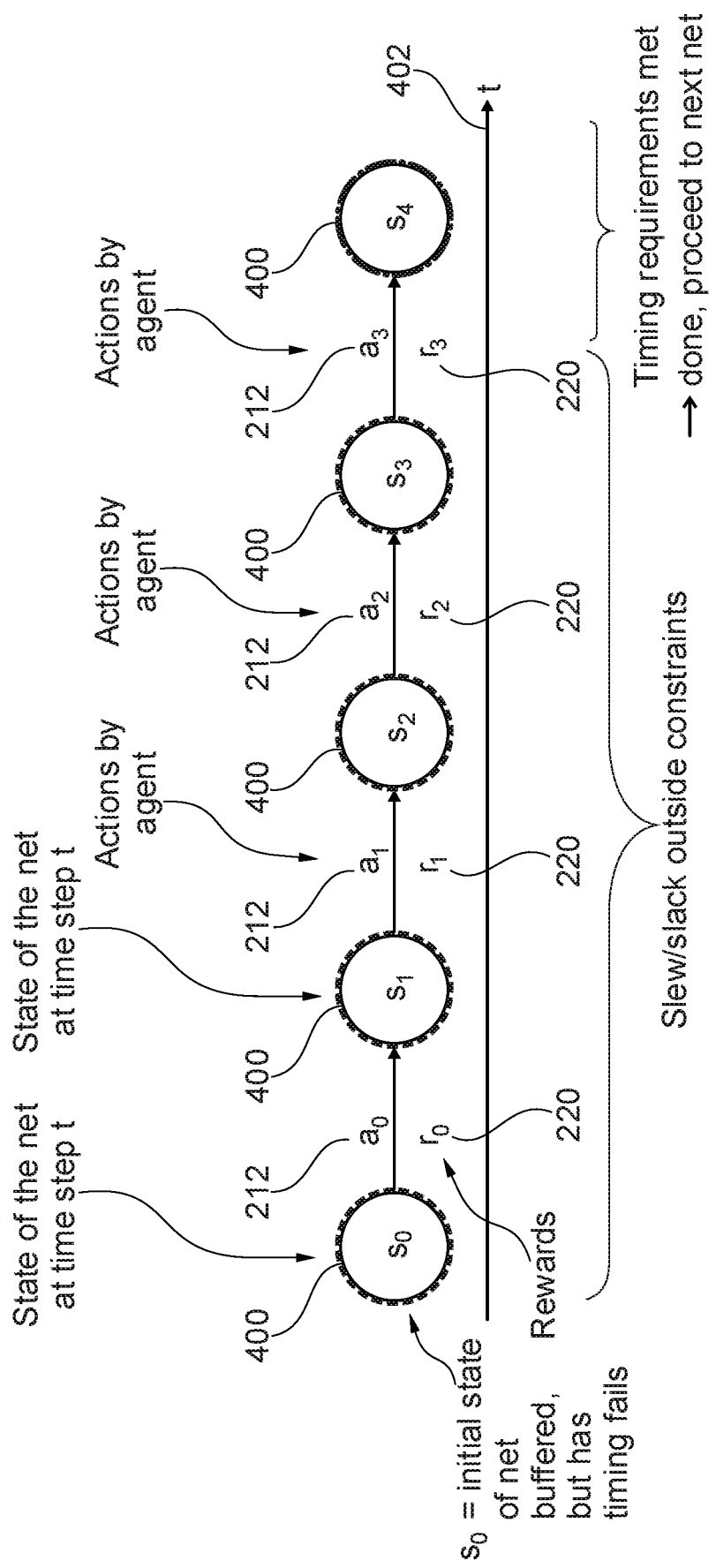
FIG. 4 illustrates the modification of an integrated circuit design using the reinforcement learning agent.

FIG. 4 illustrates the modification of the integrated circuit design using the reinforcement learning agent 200. FIG. 4 shows the state 400 of the graph 210 at different time intervals. Each of these states 400 is a combination of the graph 210, which represents the current design of the network of conductors and repowering structures, and a status 218 of the timing failure 208 for this network of conductors and repowering structures. The state 400 changes after each iteration and is shown as a function of time 402. S0, S1, S2, and S3 represent states when the slew or slack is outside of the allowed constraints. When the state 400 is S4, the timing requirements are met. The various values R0, R1, R2, and R3 represent the training reward 220 after each step. A0, A1, A2, and A3 represent the modification recommendations 212.

Figure 5:
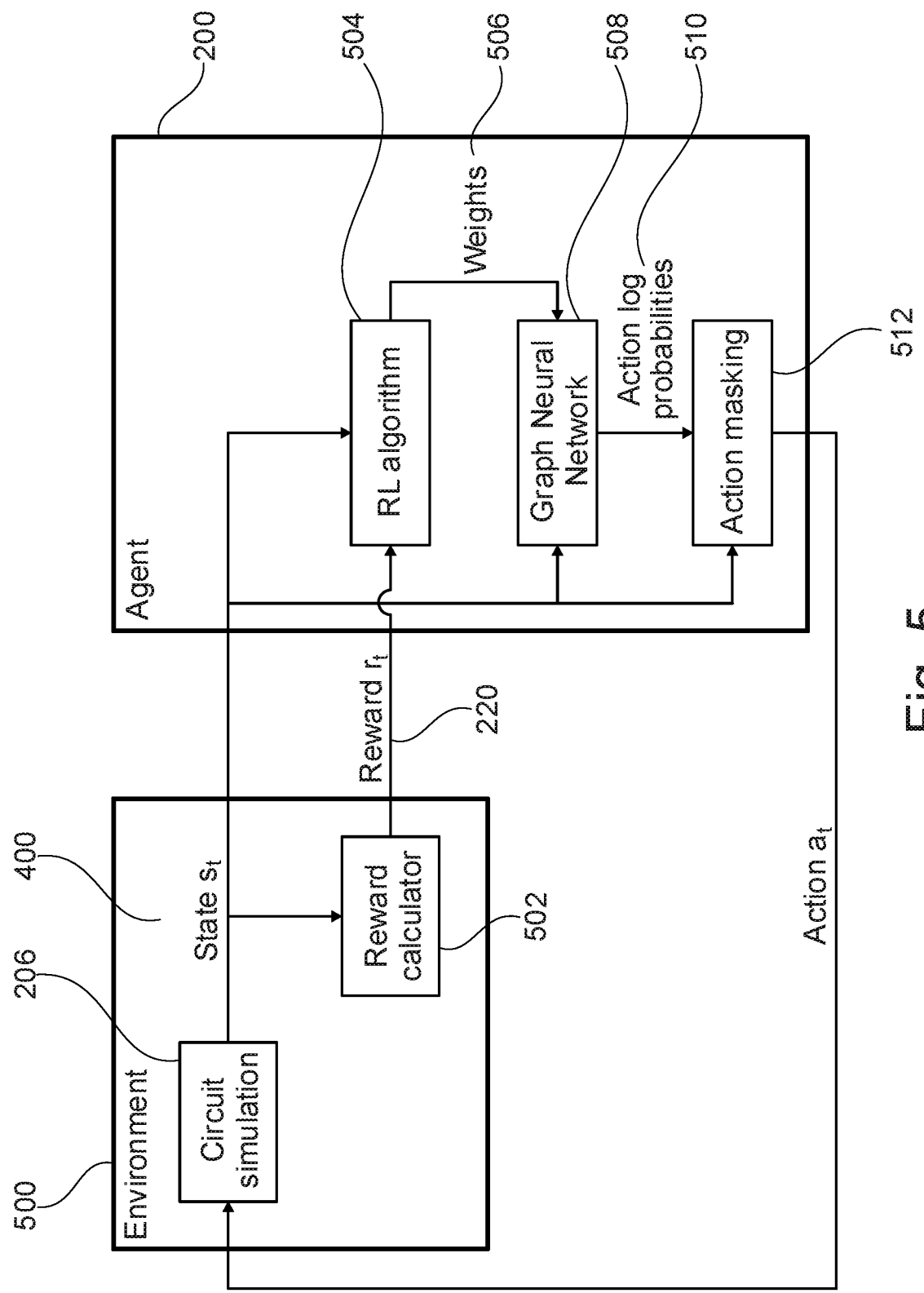
FIG. 5 illustrates a system overview of the reinforcement learning agent.

FIG. 5 illustrates a system overview of the reinforcement learning agent 200. The system overview is shown as containing a design environment 500 and the reinforcement learning agent 200. The design environment 500 is shown as containing a circuit simulation module 206 which is used to produce the current state 400, as described above, for a particular iteration of the network of conductors and repowering structures of the integrated circuit design 204. The status 218 of the timing failure 208 may be used by a reward calculator 502 to calculate the training reward 220. As input, the design environment 500 may receive a modification recommendation 212 or modification commands 214 to be used to modify the integrated circuit design 204 between iterations.

The reinforcement learning agent 200 is shown as comprising a reinforcement learning algorithm 504, a graph neural network 508 and an action masking component 512. The status 218 of the timing failure 208 is input into the reinforcement learning algorithm 504, the graph neural network 508, and the action masking 512. The training reward 200 is input into the reinforcement learning algorithm 504. The reinforcement learning algorithm 504 produces changes in the weights 506 for the graph neural network 508. This updates the graph neural network 508 and thereby trains it.

For each design iteration, the graph neural network 508 receives the graph 210 as input and in response produces action log probabilities 510 which may be equivalent to the modification recommendations 212. These action log probabilities 510 are then filtered in a masking 512 step. Using only those which are allowed, a modification recommendation 212 or modification commands 214 may be formulated by choosing according to the probabilities.

Figure 6:
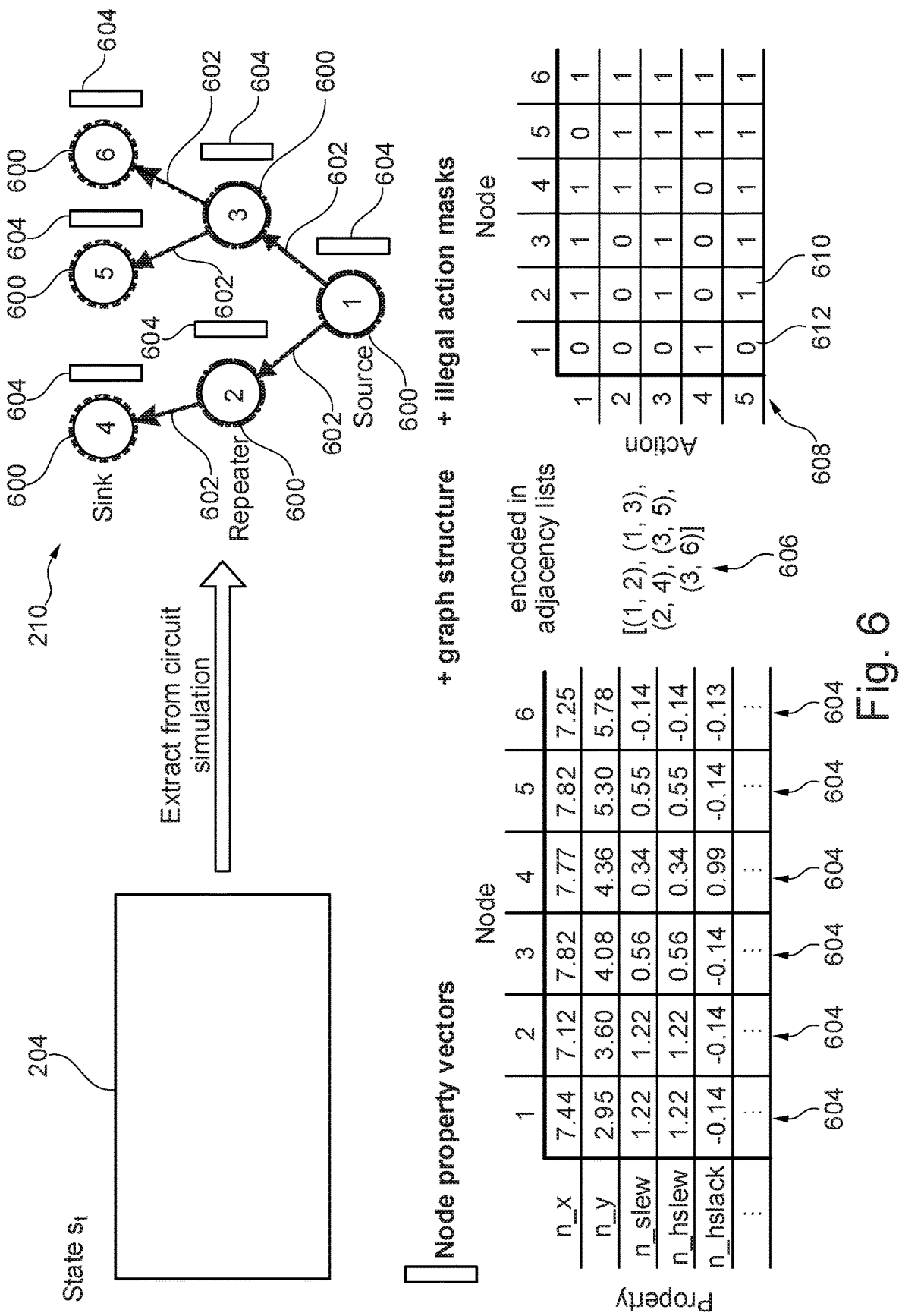
FIG. 6 illustrates the construction of the graph that represents a network of conductors and repowering structures.

FIG. 6 illustrates a construction of the state 400 for one iteration. The construction of the graph 210 is shown as being extracted from the current integrated circuit design 204. The network of conductors and repowering structures being modified is extracted from the design environment to produce the graph 210. The graph 210 comprises nodes 600 and edges 602. There is a property vector 604 associated with each node 600. Below, examples of property vectors 604 are illustrated. In this example each property vector 604 has a number of properties. In this example, n_x and n_y are the physical coordinates of the node relative to source coordinates as a multiple or fraction of a lowest metal layer cycle reach. n_slew and the n_hslew are the slew and hierarchical slew given in a multiple of or a fraction of a signal's slew rate. n_hslack is the hierarchical time slack given in a multiple of or a fraction of the signal's time slack. The graph structure 606 is encoded in adjacency lists. The set of masks 608 define actions which are either possible 610 or impossible 612 for a particular node. Possible actions are indicated in the table as 1, impossible actions 612 are indicated by a 0. Use of the mask may be beneficial because it can be used to eliminate actions which cannot be performed on a particular node from consideration.

The set of masks 608 may be constructed after each iteration based on the current state 400 (as illustrated in FIG. 4) of each individual node. Based on a node's 600 current state 400 various modifications may be possible or impossible. For example, if a node 600 already has wire code that indicated the largest possible conductor thickness or size, then it cannot be increased. In this case a further increase of the wire code could be excluded by the set of masks 608. A predefined logic can, for example, be used to derive the mask for a specific node 600 based on its current property vector 604. As the state 400 changes through various iterations the property vector 604 of individual nodes 600 also change. As the property vectors 604 change the actions which may be performed on them may also change.

Figure 7:
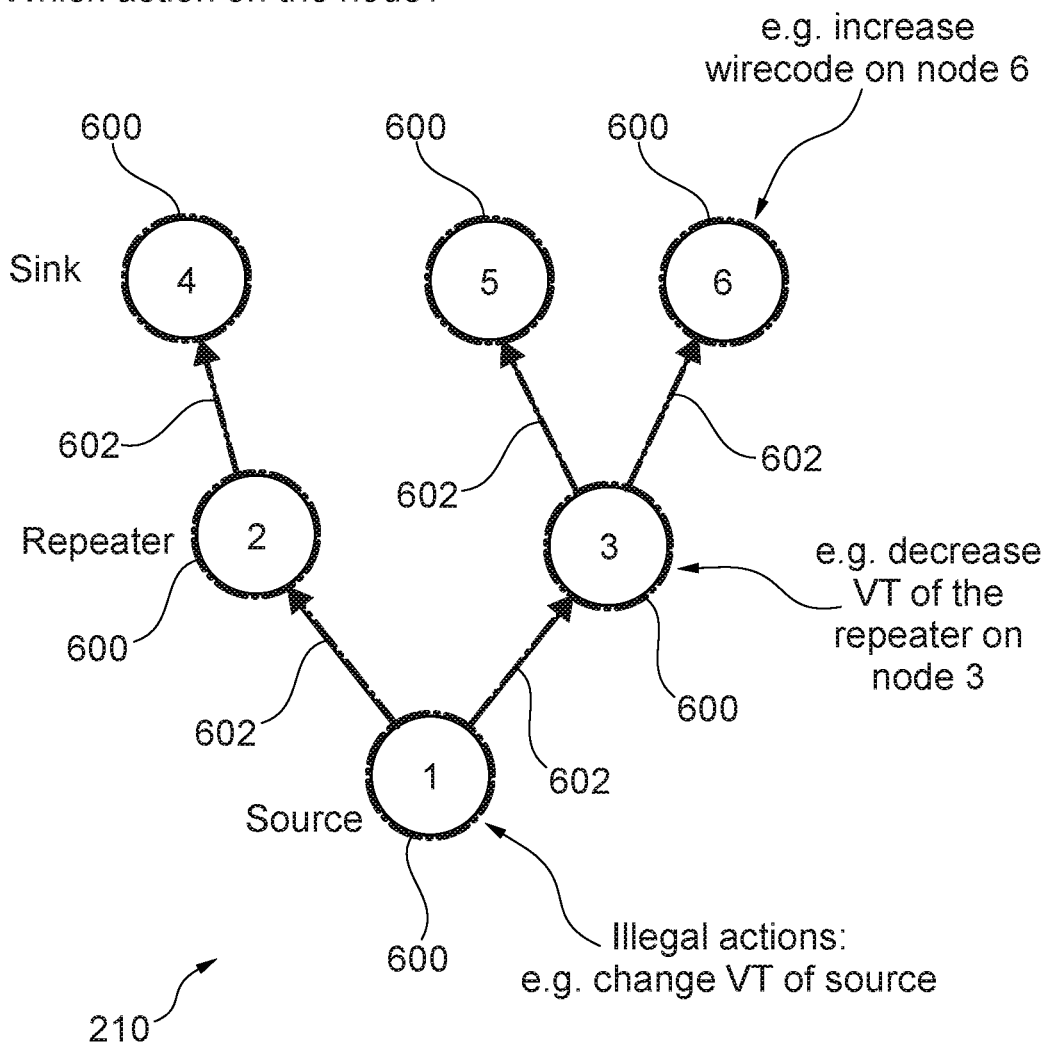
FIG. 7 shows another view of the graph and is used to illustrate how a modification recommendation may be formed.

FIG. 7 shows another view of the graph 210 and is used to illustrate how a modification recommendation 212 may be formed. The determination of the modification recommendation 212 in this example has two steps, it is first of all used to determine which of the nodes 600 is modified and then second, which action should be performed on that node. To perform this, possible actions for each of the nodes 600 is first determined and then the action with the highest probability or which meets a predetermined criterion is selected. Alternatively, one may select an action from the possible actions stochastically according to their individual probabilities.

Possible example actions include wire code up, wire code down, use layer up, use layer down, repeater type up, repeater type down, repeater Block Hardware Code (BHC) up, repeater BHC down, repeater threshold voltage (VT) up, repeater VT down, add inverter mid-route, remove an inverter, add repeater (or buffer) mid-route, and remove a repeater (or buffer). Wire code up and wire code down refers to specifying a different conductor (wire) between nodes. Wire code up could refer to using a conductor which has more conductive metal and take up more space, but which has fewer resistive losses and possibly a reduced impedance. The Block hardware code refers to the driving strength (current supply) provided by a repowering structure such as a repeater, buffer, or inverter. Block hardware code up could refer to an increase in the current supplied. The VT is the threshold voltage of a repowering structure. A higher VT means a slower repeater or repowering structure but may have more power savings due to less leakage power. Changing the use layer up or down may change the layer in which a conductor is formed.

Figure 8:
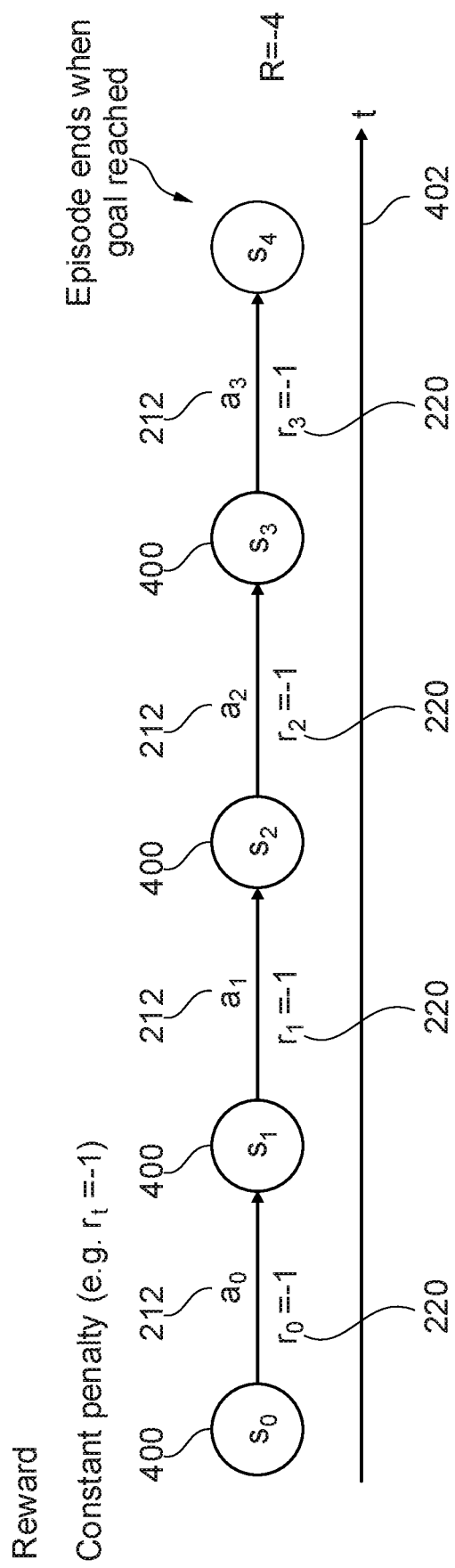
FIG. 8 illustrates the calculation of the training reward when there is a constant penalty.
Figure 9:
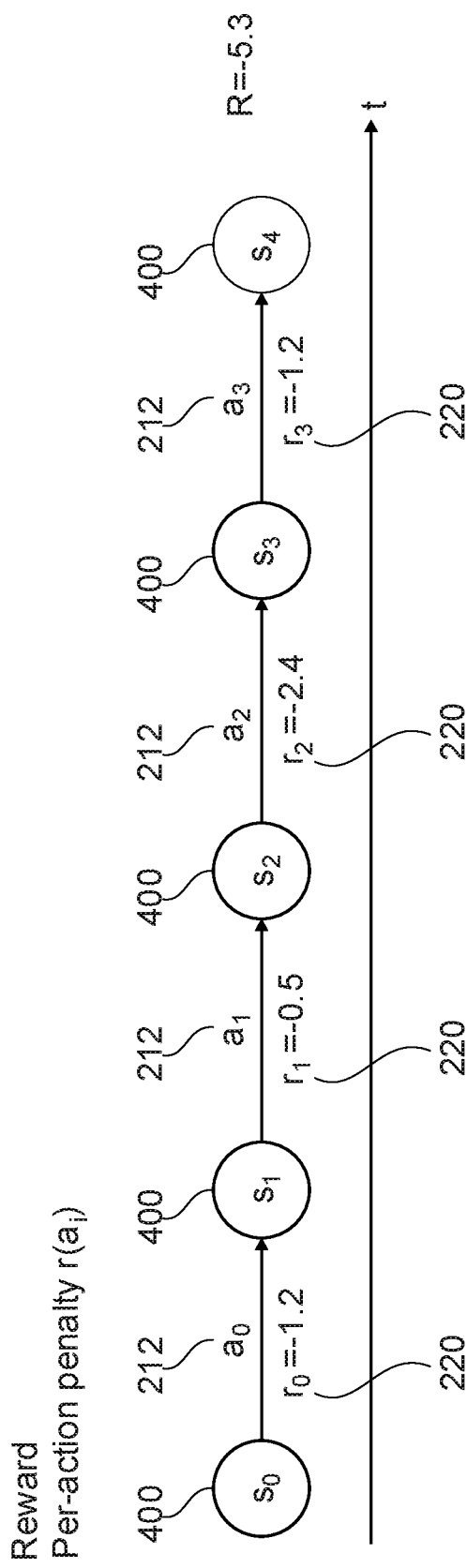
FIG. 9 illustrates the calculation of the training reward when there is a per-action penalty.
Figure 10:
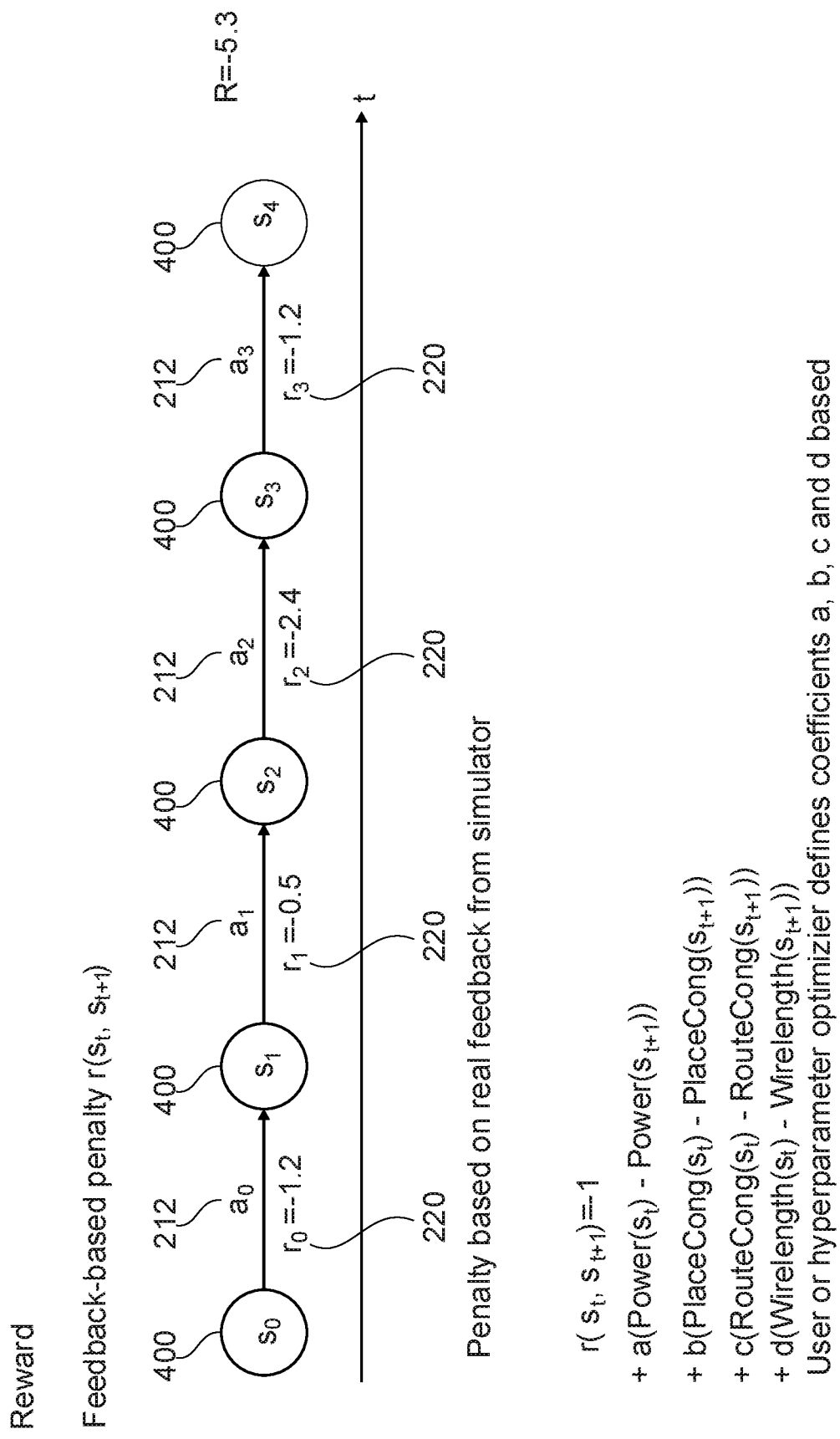
FIG. 10 illustrates the calculation of the training reward when the feedback-based penalty is used.

FIG. 4 illustrated the modification of an integrated circuit design using a reinforcement learning agent with an arbitrary training reward 220. In FIGS. 8 through 10 the modification of the integrated circuit design using alternative training rewards 200 is illustrated.

FIG. 8 illustrates the calculation of the training reward 220 when there is a constant penalty. In the constant penalty, for each duration the penalty is increased by the same increment. This heavily causes the reinforcement learning agent 220 to minimize the time to solution and minimize the computation time. This also heavily prioritizes the timing closure or elimination of the timing failure 208 but may not take into consideration other constraints such as the power consumption the routing and placement congestion or the wire length or other factors.

FIG. 9 illustrates the calculation of the training reward 220 when there is a per-action penalty. In this case the penalty 220 is assigned based on the particular modification recommendation 212. There may be a penalty for each modification recommendation 212 that is defined by a hyper parameter or is predefined. This may be beneficial because the reinforcement learning agent 200 minimizes the number of steps to the solution and computational time when heuristically taking side constraints into account. Other considerations when using a per-action penalty is that the per-action penalty may need to come from some place such as the user may tune or adjust the hyper parameters or run an optimizer to determine the penalty for each particular action. The per-action penalty can be used to impact side constraints indirectly.

FIG. 10 illustrates the calculation of the training reward 220 when the feedback-based penalty is used. In this case, the penalty is based on the actual results of the circuit simulation module 206. An advantage of this is that the reinforcement learning agent 200 learns to take actual impact on side constraints into account. One factor to consider is that the various penalties may be calculated based on feedback with different parameters such as wire length or power or congestion. These may for example be combined using a hyper parameter or weighting factors. The weighting factors could be for example determined by having their values tuned by an operator or by using an optimization system.

Figure 11:
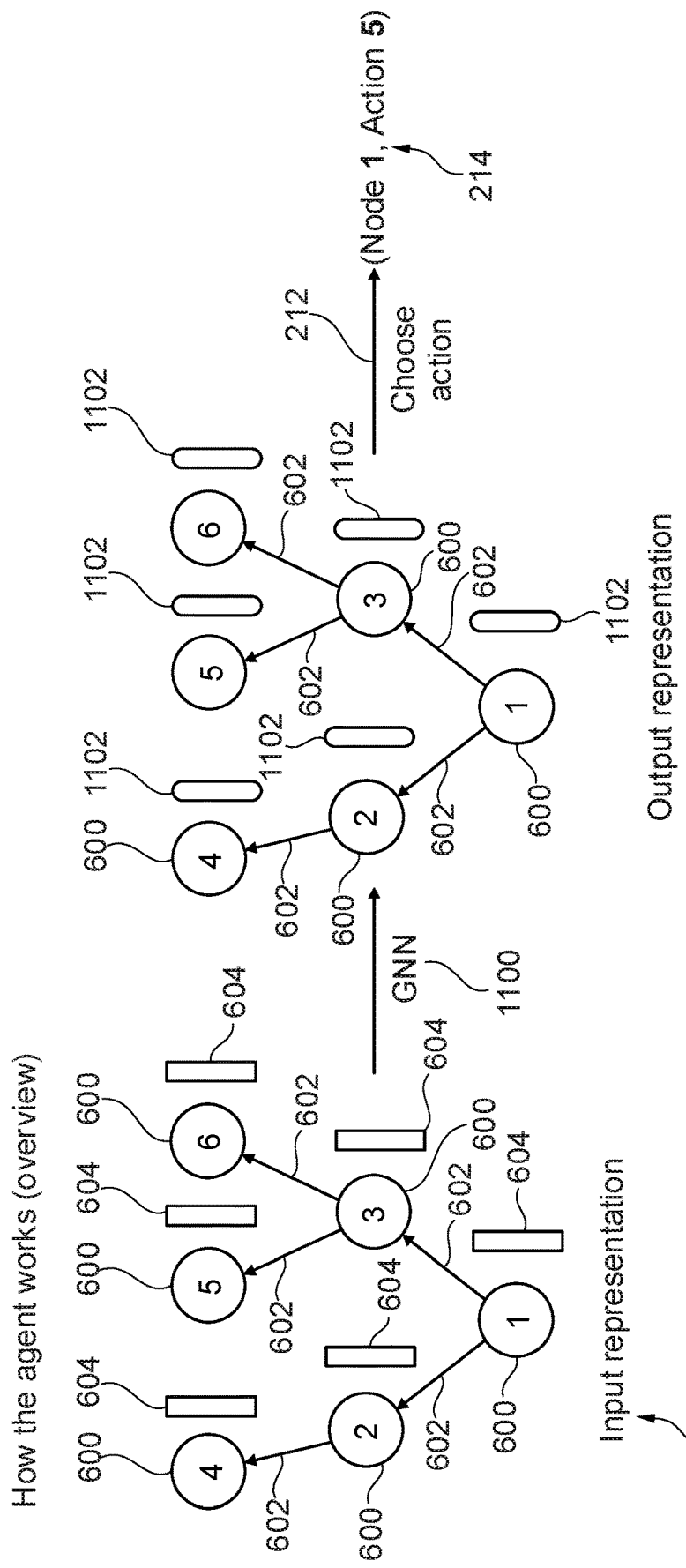
FIG. 11 illustrates at a high level how the reinforcement learning agent functions.

FIG. 11 illustrates at a high level how the reinforcement learning agent 200 functions. There is a graph neural network 1100 that takes as input the graph 210. The graph 210 again comprises nodes 600 and edges 602 with a property vector 604 associated with each node 600. In response the graph neural network outputs a node-specific modification recommendation 1102 for each of the nodes 600. This results in a modification recommendation 212 that can be chosen and used to generate a modification command 214.

The graph neural network 1100 is a single layer Graph Convolutional Network (GCN). This consists of two fully connected networks. The graph neural network may be adapted to the topology of electrical nets. These may be directed graphs with bi-directional information flow. They may generate one output vector per input node and the graph neural network 1100 is adaptive to the size of the net. That is to say, the graph neural network 1100 will function for an arbitrarily sized and shaped graph, as long as each node has only one incoming directed edge.

Figure 12:
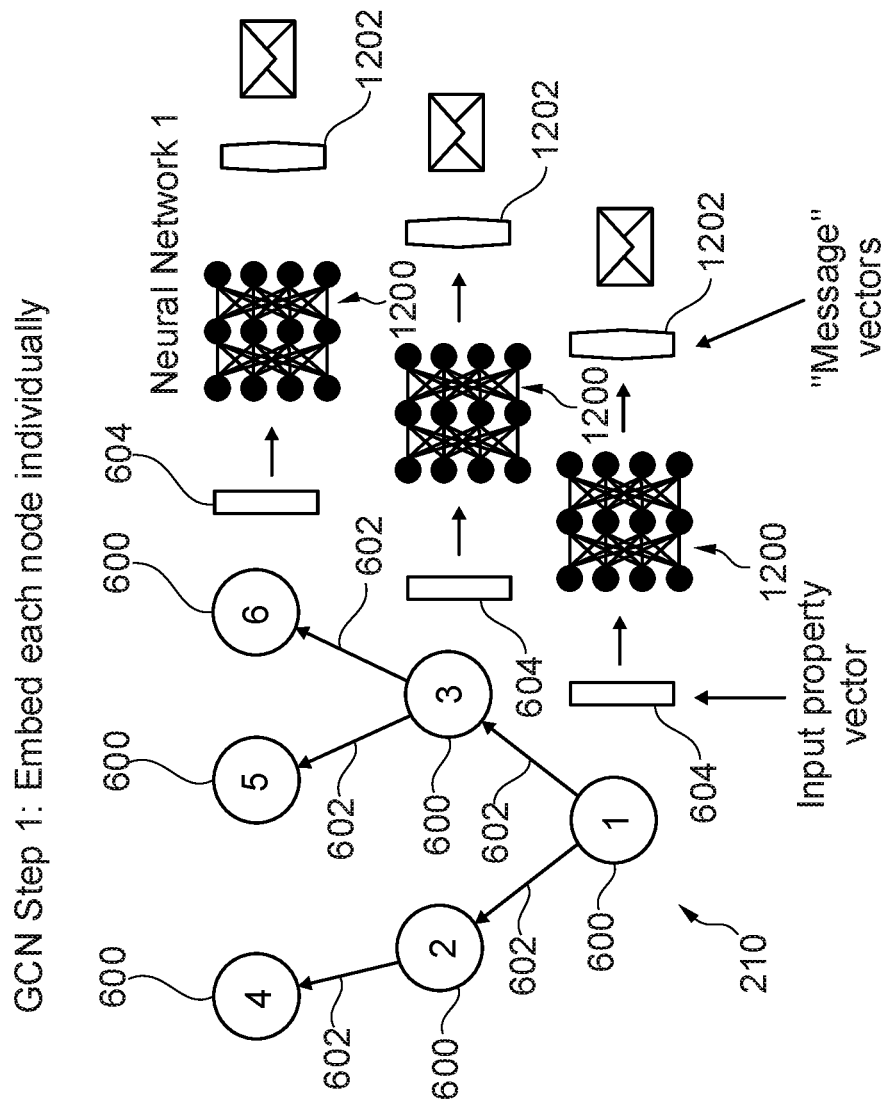
FIG. 12 illustrates a first step in implementing the graph neural network.

FIG. 12 illustrates a first step in implementing the graph neural network 1100. The graph 210 is again shown. The property vector 604 from each node 600 is input into an embedding portion 1200 which then outputs a message vector 1202 for each node. In this example the embedding portion 1202 is a neural network with three fully connected layers. The embedding portion 1200 is the same neural network for each node. This means that the first step works regardless of the number of nodes of the graph 210.

Figure 13:
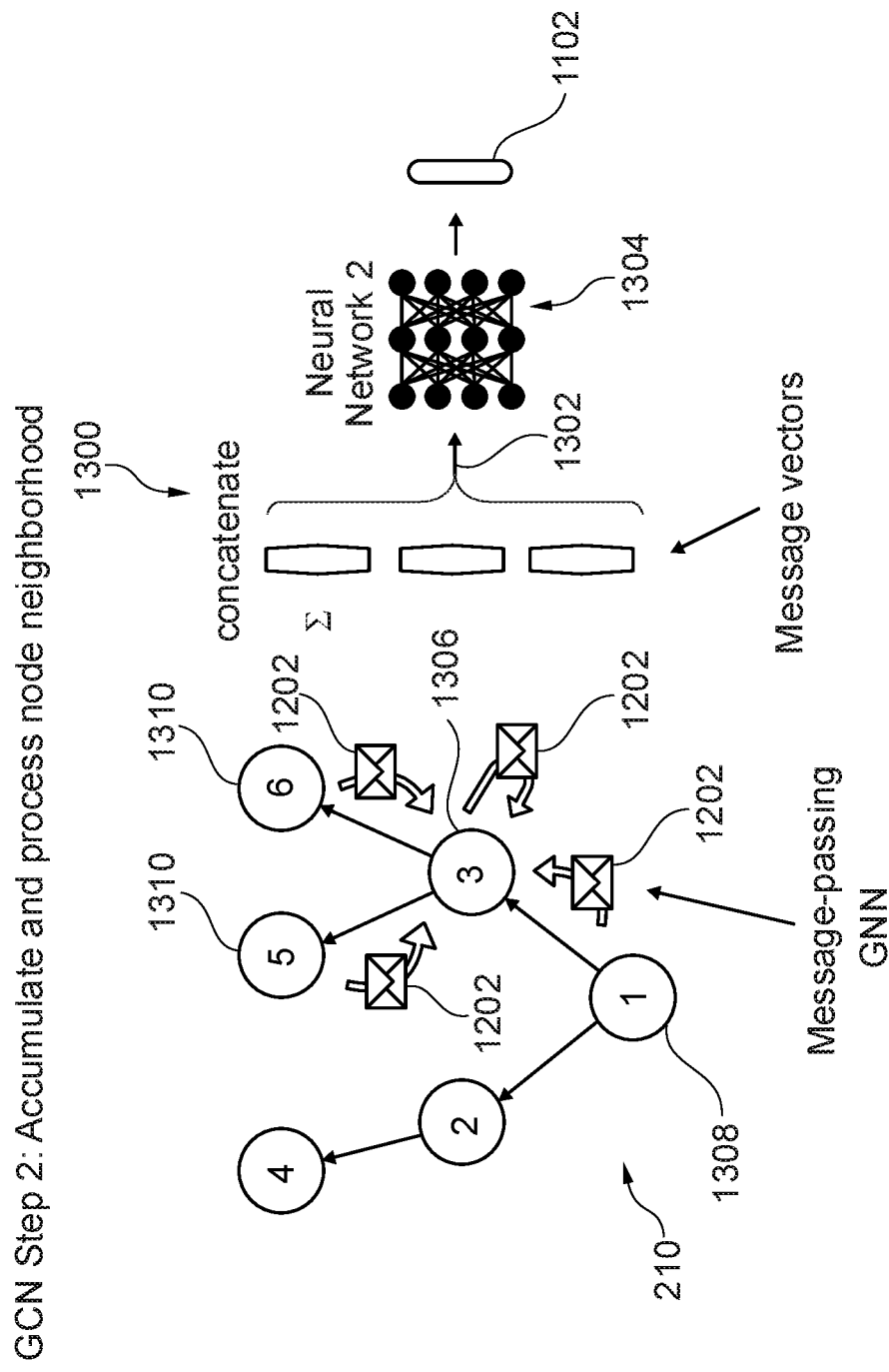
FIG. 13 illustrates the second step in implementing the graph neural network.

FIG. 13 illustrates the second step in implementing the graph neural network. For each node the message vector 1202 of itself and its neighbors are concatenated by a concatenation portion 1300 to form a neighborhood representation vector 1302. Before concatenation, multiple message vectors 1202 from sink nodes may be combined or aggregated. The message vectors from sink nodes may be aggregated in a variety of ways. For example, the message vectors 1202 from sink nodes may be summed, the maximum value for vector components may be used, or a mean value for vector components may be used.

The neighborhood representation vector is then input into a processing node 1304. The processing node 1304 is another fully connected layer neural network. In response to receiving the neighborhood representation vector 1302 the node-specific modification recommendation 1102 is output. The node being processed 1306 is adjacent to a source node 1308 and at least one sink node 1310. In the figure, two sink nodes 1310 are shown, however there may be more than two sink nodes. The message vectors 1202 are collected from the node being processed 1306 as well as the source node 1308 and its sink nodes 1310. FIGS. 12 and 13 illustrate that the graph neural network 1100 can be applied to graphs 210 of arbitrary size and topology.

In FIG. 13, the source node 1308 is also the global source node for the graph 210 and the two sink nodes 1310 are also global sink nodes for the graph 210. This does not need to be the case. The graph may contain a larger number of layers. Each interior node will have its own source node 1308 and at least one sink node 1310. The source node 1308 does not need to be a global source node and the at least one sink node 1310 does not need to be a global sink node.

Figure 14:
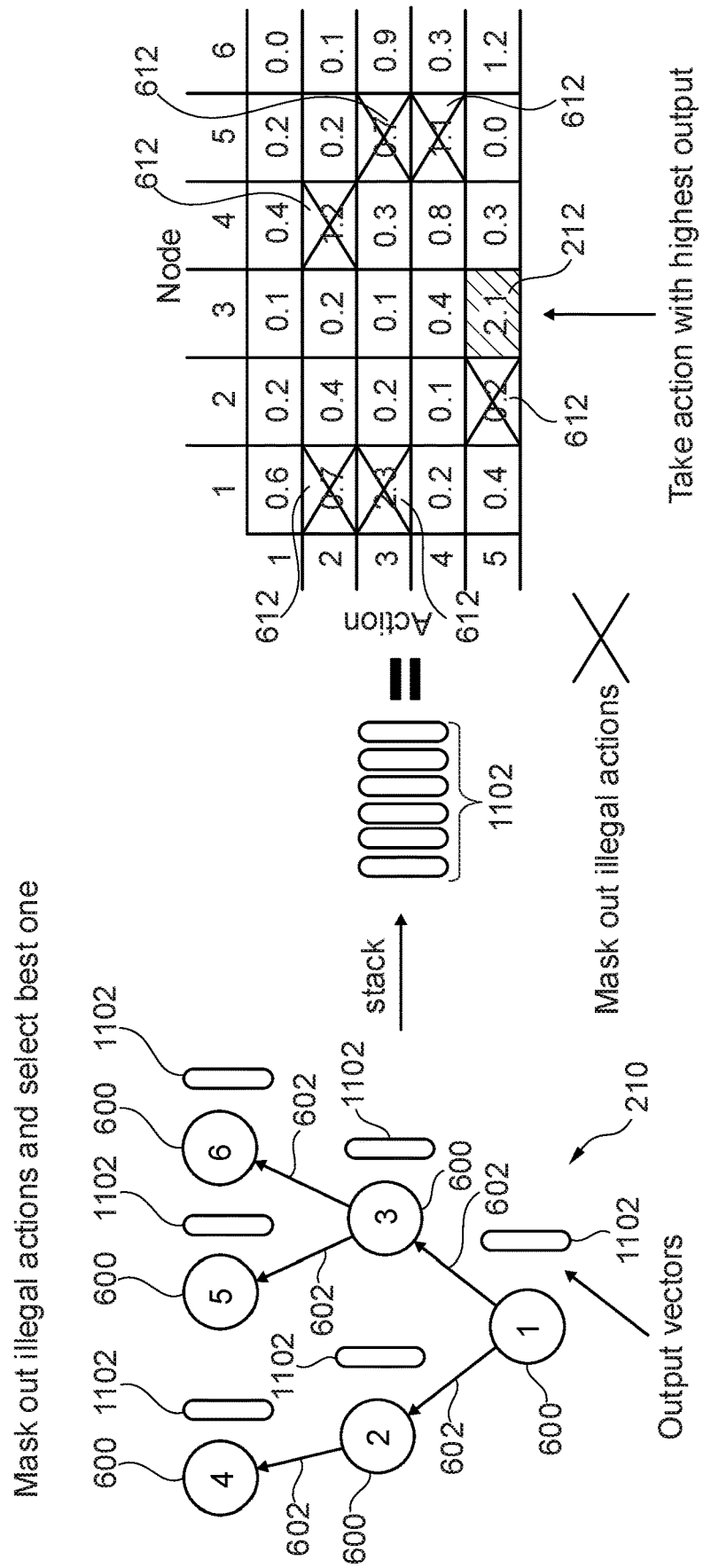
FIG. 14 illustrates how the modification recommendation can be determined from the individual node-specific modification recommendations.

FIG. 14 illustrates how the modification recommendation 212 can be determined from the individual node-specific modification recommendations 1102. The node-specific modification recommendations 1102 have scores assigned to them. The scores may, for example, be an assigned probability, unnormalized probability, log probability, or even a state action value. In this example, the scores corresponding for the node specific modification recommendations 1102 are placed into a table which represents a set of masks 608. The node specific modification recommendations 1102 scores are listed and impossible actions 612 have been crossed out. For example, action 3 of node 1 has the highest score but this action is impossible 612 so it is ignored. The highest score for a possible action is for action 5 with node 3. Action 5 on node 3 is then provided as the modification recommendation 212.

Various examples may possibly be described by one or more of the following features in the following numbered clauses:

Clause 1. A computer implemented method of correcting a timing failure of a network of conductors and repowering structures in an integrated circuit design using a reinforcement learning agent, said reinforcement learning agent comprising a neural network, said method comprising:
  receiving a graph comprising nodes and edges that encodes said network of conductors and repowering structures; and
  receiving a modification recommendation from said reinforcement learning agent in response to inputting said graph into said reinforcement learning agent.

Clause 2. The computer implemented method of clause 1, said method further comprising generating modification commands configured for modifying said integrated circuit design using said modification recommendation.

Clause 3. The computer implemented method of clause 2, said method further comprising:
  inputting said integrated circuit design into a circuit simulation module to detect said timing failure of said network of conductors and repowering structures;
  encoding said network of conductors and repowering structures as said graph;
  constructing a modified integrated circuit design by modifying said integrated circuit design using said modification commands;
  inputting said modified integrated circuit design into said circuit simulation module to detect a status of said timing failure;
  determining a training reward for said reinforcement learning agent using said status of said timing failure; and
  training said reinforcement learning agent using said training reward.

Clause 4. The computer implemented method of clause 3, said method further comprising repeating said method until said timing failure is resolved.

Clause 5. The computer implemented method of clause 3 or 4, said training reward being calculated as a constant penalty per action taken by said reinforcement learning agent.

Clause 6. The computer implemented method of clause 3 or 4, said training reward being calculated as a per-action penalty.

Clause 7. The computer implemented method of clause 6, wherein said training reward being calculated as a value determined by a hyperparameter assigned to any one of the following actions: wire code up, wire code down, block hardware code up, block hardware code down, repeater threshold voltage up, repeater threshold voltage down, add inverter mid-route, remove an inverter, add repeater mid-route, remove a repeater, add a buffer mid-route, remove a buffer, add a repowering structure mid route, and remove a repowering structure.

Clause 8. The computer implemented method of claim 3 or 4, said training reward being calculated as a feedback-based penalty.

Clause 9. The computer implemented method of clause 8, said training reward being calculated using any one of the following weighted constraints: power consumption by the integrated circuit, total length of said network of conductors, noise of said network of conductors, route congestion of said network of conductors, placement congestion of said network of conductors, and combinations thereof.

Clause 10. The computer implemented method of any one of the preceding clauses, said nodes comprising an instance in said conductor network, said edges being directed edges representing a conductor between two instances in said conductor network, said nodes comprising a set of property vectors descriptive of said nodes and said edges.

Clause 11. The computer implemented method of clause 10, said property vectors being descriptive of said directed edges either directed into or directed out of said nodes.

Clause 12. The computer implemented method of any one of the preceding clauses, said method further comprising normalizing said set of property vectors of said graph before inputting said graph into said reinforcement learning agent.

Clause 13. The computer implemented method of clause 12, said graph being normalized according to any one of the following:
  relative to source coordinates as a multiple of or as a fraction of a lowest metal layer cycle reach of said integrated circuit design;
  relative to or as a multiple of or as a fraction of a signal cycle time of said integrated circuit design;
  relative to or as a multiple of or as a fraction of a signal slew limit of said integrated circuit design; and
  combinations thereof.

Clause 14. The computer implemented method of any one of the preceding clauses, said neural network of said reinforcement learning agent being configured to provide a score for possible circuit modifications, receiving of said modification recommendation in response to inputting said graph into said neural network reinforcement learning agent comprising selecting the modification recommendation from the score for said possible circuit modifications by the reinforcement learning agent or received from a user interface.

Clause 15. The computer implemented method of clause 14, said method further comprising constructing a set of masks marking said possible modification recommendations of said conductor network as possible or impossible, selecting said modification recommendation comprising excluding said possible modification recommendations marked as impossible.

Clause 16. The computer implemented method of any one of clauses 10 through 15, said neural network being a graph neural network.

Clause 17. The computer implemented method of any one of clauses 10 through 16, said neural network comprising:
  an embedding portion configured to output a message vector in response to receiving said property vector of a node of said graph encoding the network of conductors and repowering structures;
  a concatenating portion configured to concatenate said message vector of said node and said message vector of adjacent nodes of said graph into a neighborhood representation vector; and a processing node configured to output a node specific modification recommendation for said node in response to receiving said neighborhood representation vector; and said modification recommendation being formed from a collection of said node specific modification recommendation for said graph.

Clause 18. The computer implemented method of clause 17, said embedding portion comprising a neural network comprising one or more fully connected neural network layers.

Clause 19. The computer implemented method of clause 17, said processing node comprising a neural network comprising one or more fully connected neural network layers.

Clause 20. The computer implemented method of any one of clauses 17, 18, or 19, said adjacent nodes comprising a single source node, and said concatenating portion of said neural network being configured to receive only a single message vector from said adjacent source node.

Clause 21. The computer implemented method of any one of clauses 17 through 19, said adjacent nodes comprising one or more adjacent sink nodes, and said concatenating portion of the neural network being configured to receive one or more message vectors from adjacent sink nodes.

Clause 22. The computer implemented method of clause 21, said one or more message vectors of said one or more adjacent sink nodes being reduced to a single message vector by said concatenating layer by any one of the following: calculating a sum of said one or more message vectors, taking an element wise maximum of said one or more message vectors, and calculating a mean of said one or more message vectors.

Clause 23. The computer implemented method of any one of the preceding clauses, said timing failure being any one of the following: a slack failure, a slew failure, and combinations thereof.

Clause 24. A computer program product comprising a computer-readable storage medium having computer-readable program code embodied therewith, said computer-readable program code configured to implement the method of any one of clauses 1 to 23.

Clause 25. A computer system comprising:
a processor configured for controlling said computer system; and
a memory storing machine executable instructions and a reinforcement learning agent, said reinforcement learning agent comprising a neural network, execution of said instructions causes said processor to:
receive a graph comprising nodes and edges that encodes a network of conductors and repowering structures in an integrated circuit design; and
receive a modification recommendation in response to inputting said graph into said neural network reinforcement learning agent.

Clause 26. The computer system of clause 25, execution of said instructions further causing said processor to generate modification commands configured for modifying said integrated circuit design using said modification recommendation.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
correcting a timing failure of a network of conductors and repowering structures in an integrated circuit design using a reinforcement learning agent, said reinforcement learning agent comprising a neural network, said correcting comprising:
receiving a graph comprising nodes and edges that encodes said network of conductors and repowering structures;
normalizing a set of property vectors of said graph before inputting said graph into said reinforcement learning agent; and
receiving a modification recommendation from said reinforcement learning agent in response to inputting said graph into said reinforcement learning agent.

2. The computer implemented method of claim 1, wherein said correcting further comprises:
generating modification commands configured for modifying said integrated circuit design using said modification recommendation.

3. The computer implemented method of claim 2, wherein said correcting further comprises:
inputting said integrated circuit design into a circuit simulation module to detect said timing failure of said network of conductors and repowering structures;
encoding said network of conductors and repowering structures as said graph;
constructing a modified integrated circuit design by modifying said integrated circuit design using said modification commands;
inputting said modified integrated circuit design into said circuit simulation module to detect a status of said timing failure;
determining a training reward for said reinforcement learning agent using said status of said timing failure; and
training said reinforcement learning agent using said training reward.

4. The computer implemented method of claim 3, further comprising:
repeating said method until said timing failure is resolved.

5. The computer implemented method of claim 3, wherein said training reward being calculated as a constant penalty per action taken by said reinforcement learning agent.

6. The computer implemented method of claim 3, wherein said training reward being calculated as a per-action penalty.

7. The computer implemented method of claim 3, wherein said training reward being calculated as a feedback-based penalty.

8. The computer implemented method of claim 7, wherein said training reward being calculated using at least one of the following weighted constraints: power consumption by the integrated circuit, total length of said network of conductors, noise of said network of conductors, route congestion of said network of conductors, placement congestion of said network of conductors, and combinations thereof.

9. The computer implemented method of claim 1, wherein said nodes comprising an instance in said conductor network, said edges being directed edges representing a conductor between two instances in said conductor network, and said nodes comprising said set of property vectors descriptive of said nodes and said edges.

10. The computer implemented method of claim 9, said set of property vectors being descriptive of said directed edges either directed into or directed out of said nodes.

11. The computer implemented method of claim 9, wherein said neural network comprises:
   an embedding portion configured to output a message vector in response to receiving a property vector of a node of said graph;
   a concatenating portion configured to concatenate said message vector of said node and other message vectors of adjacent nodes of said graph into a neighborhood representation vector; and
   a processing node configured to output a node specific modification recommendation for said node in response to receiving said neighborhood representation vector;
   wherein:
   said modification recommendation is formed from a collection of said node specific modification recommendation for said node and other node specific modification recommendations for said nodes of said graph.

12. The computer implemented method of claim 11, wherein said embedding portion comprises a neural network comprising one or more fully connected neural network layers.

13. The computer implemented method of claim 11, wherein said processing node comprises a neural network comprising one or more fully connected neural network layers.

14. The computer implemented method of claim 11, wherein:
   said adjacent nodes comprise a single source node, and
   said concatenating portion is configured to receive only a single message vector from a single adjacent source node.

15. The computer implemented method of claim 11, wherein:
   said adjacent nodes include one or more adjacent sink nodes, and
   said concatenating portion is configured to receive one or more message vectors from said adjacent sink nodes.

16. The computer implemented method of claim 15, wherein said one or more message vectors of said one or more adjacent sink nodes are reduced to a single message vector by said concatenating portion by any one of the following processes: calculating a sum of said one or more message vectors, taking an element wise maximum of said one or more message vectors, and calculating a mean of said one or more message vectors.

17. The computer implemented method of claim 1, said set of property vectors of said graph being normalized according to at least one of the following:
   relative to source coordinates as a multiple of or as a fraction of a lowest metal layer cycle reach of said integrated circuit design;
   as a multiple of or as a fraction of a signal cycle time of said integrated circuit design; and
   as a multiple of or as a fraction of a signal slew limit of said integrated circuit design.

18. The computer implemented method of claim 1, wherein;
   said neural network is configured to provide a score for possible circuit modifications, and
   said correcting further comprising:
   selecting the modification recommendation based on said score by said reinforcement learning agent.

19. The computer implemented method of claim 18, further comprising:
   constructing a set of masks marking said possible circuit modifications as possible or impossible, and
   wherein:
   selecting said modification recommendation includes:
   excluding a set of possible modification recommendations marked as impossible.

20. The computer implemented method of claim 1, wherein said neural network is a graph neural network.

21. The computer implemented method of claim 1, said timing failure being at least one of the following: a slack failure, and a slew failure.

22. A computer program product comprising a computer-readable storage medium having computer-readable program code embodied therewith, said computer-readable program code configured to:
   correct a timing failure of a network of conductors and repowering structures in an integrated circuit design using a reinforcement learning agent comprising a neural network wherein said computer-readable program code comprises:
   program code configured to receive a graph comprising nodes and edges that encodes said network of conductors and repowering structures;
   program code configured to normalize a set of property vectors of said graph before inputting said graph into said reinforcement learning agent; and
   program code configured to receive a modification recommendation from said reinforcement learning agent in response to inputting said graph into said reinforcement learning agent.

23. A computer system comprising:
   a processor set; and
   a memory;
   wherein:
   said processor set is structured, located, connected, and/or programmed to run program instructions stored on said memory; and
   said program instructions which, when executed by said processor set, cause said processor set to perform a method comprising:
   correcting a timing failure of a network of conductors and repowering structures in an integrated circuit design using a reinforcement learning agent, said reinforcement learning agent comprising a neural network, said correcting comprising:
   receiving a graph comprising nodes and edges that encodes a network of conductors and repowering structures in an integrated circuit design;
   normalizing a set of property vectors of said graph before inputting said graph into said reinforcement learning agent; and
   receiving a modification recommendation in response to inputting said graph into said neural network reinforcement learning agent.

24. The computer system of claim 23, wherein said method further comprises:
   generating modification commands configured for modifying said integrated circuit design using said modification recommendation.

* * * * *